United States Patent
Han et al.

(10) Patent No.: US 12,218,857 B2
(45) Date of Patent: Feb. 4, 2025

(54) METHOD AND DEVICE FOR ESTABLISHING SERVICE PATH, ELECTRONIC APPARATUS AND READABLE STORAGE MEDIUM

(71) Applicant: ZTE CORPORATION, Guangdong (CN)

(72) Inventors: Yufang Han, Guangdong (CN); Jinghai Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 357 days.

(21) Appl. No.: 17/761,586

(22) PCT Filed: Sep. 16, 2020

(86) PCT No.: PCT/CN2020/115596
§ 371 (c)(1),
(2) Date: Mar. 17, 2022

(87) PCT Pub. No.: WO2021/052364
PCT Pub. Date: Mar. 25, 2021

(65) Prior Publication Data
US 2022/0385595 A1 Dec. 1, 2022

(30) Foreign Application Priority Data
Sep. 19, 2019 (CN) .......................... 201910891042.1

(51) Int. Cl.
*H04L 47/72* (2022.01)
*H04L 45/02* (2022.01)

(52) U.S. Cl.
CPC .............. *H04L 47/72* (2013.01); *H04L 45/02* (2013.01)

(58) Field of Classification Search
CPC .............................. H04L 45/02; H04L 47/72
See application file for complete search history.

(56) References Cited

U.S. PATENT DOCUMENTS 10,855,574 B2 * 12/2020 Dong ...................... H04L 45/03
2017/0005901 A1 * 1/2017 Gareau ............... H04L 43/0811
(Continued)

FOREIGN PATENT DOCUMENTS

| CN | 106803814 A | 6/2017 |
| EP | 2154841 A1 | 2/2010 |

OTHER PUBLICATIONS

European Patent Office, EP20864520.0 Extended European Search Report issued on Sep. 15, 2023.

*Primary Examiner* — Melanie Jagannathan
(74) *Attorney, Agent, or Firm* — Li & Cai Intellectual Property (USA) Office (57) ABSTRACT

Provided are a method and device for establishing a service path, an electronic apparatus, and a readable storage medium. The method includes: receiving request information for establishing a path for a service, where the request information includes a service type and a resource reservation scheme; computing a path for the service according to topology information of a FlexE link through which the service is transmitted and the request information; and reserving a resource and establishing a path for the service according to the service type and the resource reservation scheme, and a service type and a resource reservation scheme on a channel of the FlexE link through which the service is transmitted.

7 Claims, 6 Drawing Sheets

(56) References Cited

U.S. PATENT DOCUMENTS

| | | | | |
|---|---|---|---|---|
| 2019/0181999 A1* | 6/2019 | Du | .................. | H04L 12/413 |
| 2019/0342022 A1* | 11/2019 | Zhou | .................. | H04J 3/0632 |
| 2020/0067827 A1* | 2/2020 | Mei | .................. | H04J 3/1658 |
| 2020/0112383 A1* | 4/2020 | Liu | .................. | H04J 3/1647 |
| 2020/0162376 A1* | 5/2020 | Du | .................. | H04L 45/50 |
| 2020/0162586 A1* | 5/2020 | Li | .................. | H04L 69/08 |
| 2020/0177305 A1* | 6/2020 | Zhang | .................. | H04J 3/1658 |
| 2020/0177442 A1* | 6/2020 | Zhang | .................. | H04J 3/14 |
| 2020/0204499 A1* | 6/2020 | Zhang | .................. | H04J 3/1658 |
| 2020/0322246 A1* | 10/2020 | Wang | .................. | H04J 3/1658 |
| 2020/0328767 A1* | 10/2020 | Zhong | .................. | H04J 3/1658 |
| 2021/0377103 A1* | 12/2021 | Li | .................. | H04L 41/0677 |
| 2021/0409140 A1* | 12/2021 | Lv | .................. | H04L 7/0012 |
| 2022/0182315 A1* | 6/2022 | Geng | .................. | H04L 45/302 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Flags                          |R|
+-+-+-+-+-+-+-+-+-+-+-+-+-+-+-+-+-+-+-+-+-+-+-+-+-+-+-+-+-+-+-+-+
|                         SRP-ID-number                         |
+-+-+-+-+-+-+-+-+-+-+-+-+-+-+-+-+-+-+-+-+-+-+-+-+-+-+-+-+-+-+-+-+
|                                                               |
//                         Optional TLVs                       //
|                                                               |
+-+-+-+-+-+-+-+-+-+-+-+-+-+-+-+-+-+-+-+-+-+-+-+-+-+-+-+-+-+-+-+-+
```

FIG. 7c

METHOD AND DEVICE FOR ESTABLISHING SERVICE PATH, ELECTRONIC APPARATUS AND READABLE STORAGE MEDIUM

TECHNICAL FIELD

The present disclosure relates to, but is not limited to, the field of network communication technology.

BACKGROUND

As an interface technology for a bearer network to implement service isolation carrying and network slicing, the flexible Ethernet (FlexE) is a lightweight enhanced version based on the current Ethernet, and has functions of bandwidth binding, channelization, sub-interface, and the like. With a FlexE shim layer in an intermediate layer between L2 (a MAC layer) and L1 (a PHY layer) of the Ethernet, the FlexE technology forms a flexible Ethernet group (FlexE group) with one or more PHYs bound thereto, which FlexE group may be regarded as a FlexE link implemented between a transmitter apparatus and a receiver apparatus. The FlexE link is a logical link with a bandwidth equal to a sum of bandwidths of multiple PHYs bound thereto. Based on a time division multiplexing distribution mechanism, the Flex shim layer schedules and distributes data from a plurality of client interfaces to a plurality of different channels in a time slot mode. Taking a 100GE pipeline as an example, the pipeline may be divided into 20 channels with a 5G rate by the FlexE Shim, and each client interface may be assigned to use one or more channels to enable service isolation.

The FlexE technology has the characteristics of flexible and adjustable bandwidth, data isolation, high reliability, low latency and the like, perfectly conforms to 5G services, and thus is accepted by global mainstream operators and suppliers. For coarse-grained services (such as 5G, 10G and the like) in a client private line scheme, a FlexE client may be used for mapping a plurality of channels to meet the bandwidth requirements thereof, and FlexE pipelines may be directly adopted for transmission. For fine-grained services with low latency and low jitter requirements, a FlexE time slot channel with 5G bandwidth is used for transmission in a convergence mode, and services among different sub-pipelines are out of interference with each other by means of hard isolation among the FlexE pipelines. Further, fine-grained services in the same channel may have features of a time division multiplexing (TDM) pipeline by, for example, emulating a sub-TDM pipeline.

Although the related protocols such as Generalized Multiprotocol Flag Switching (GMPLS) support establishment of a FlexE channel path, flexible establishment of a service path according to a service type and a resource reservation scheme is not supported in the above-mentioned client private line scenario.

SUMMARY

An embodiment of the present disclosure provides a method for establishing a service path, including: receiving request information for establishing a path for a service, the request information including a service type and a resource reservation scheme; computing a path for the service according to topology information of a Flexible Ethernet (FlexE) link through which the service is transmitted and the request information; and reserving a resource and establishing a path for the service according to the service type and the resource reservation scheme, and a service type and a resource reservation scheme on a channel of the FlexE link through which the service is transmitted.

An embodiment of the present disclosure further provides a device for establishing a service path, including: a receiving module configured to receive request information for establishing a path for a service, the request information including a service type and a resource reservation scheme; a computation module configured to compute a path for the service according to topology information of a Flexible Ethernet (FlexE) link through which the service is transmitted and the request information; and an establishment module configured to reserve a resource and establish a path for the service according to the service type and the resource reservation scheme, and a service type and a resource reservation scheme on a channel of the FlexE link through which the service is transmitted.

According to an embodiment of the present disclosure, there is further provided a computer-readable storage medium having a computer program stored thereon, where the computer program is configured to, when executed, cause any one of the methods for establishing a service path described herein to be implemented.

According to an embodiment of the present disclosure, there is further provided an electronic apparatus, including a memory and a processor, where the memory has a computer program stored thereon, and the processor is configured to execute the computer program to implement any one of the methods for establishing a service path described herein.

DETAIL DESCRIPTION OF EMBODIMENTS

For clarity and better understanding of the objects, technical solution and advantages of the present disclosure, embodiments of the present disclosure will now be described in detail in conjunction with the accompanying drawings. It should be noted that the embodiments of the present application and features therein may be combined with each other in any manner as long as they are not contradictory.

The operations illustrated in the flowchart of the drawings may be executed in a computer system such as a set of computer-executable instructions. Also, although a logical order is shown in the flowchart, in some cases, the operations shown or described may be performed in a different order than illustrated herein.

Figure 1:
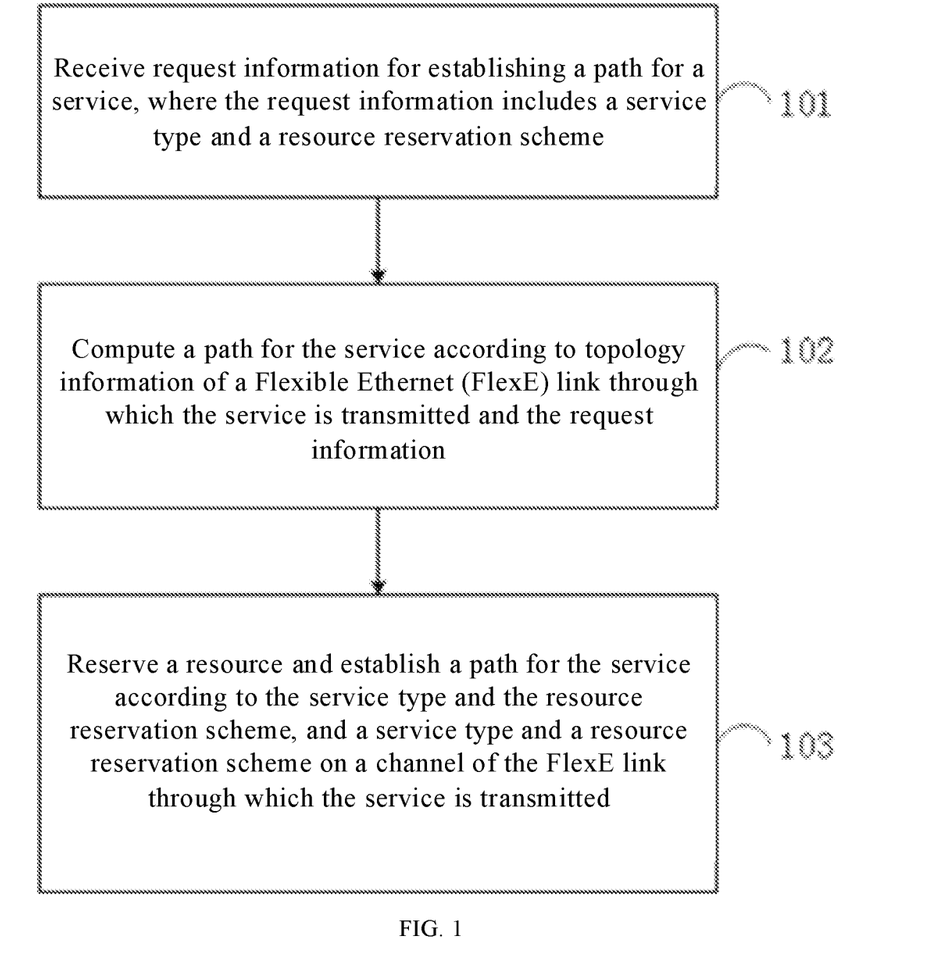
FIG. 1 is a flowchart of a method for establishing a service path according to an embodiment of the present disclosure.

An embodiment of the present disclosure provides a method for establishing a service path. FIG. 1 is a schematic flowchart of a method for establishing a service path. A method for establishing a service path according to the embodiment of the present disclosure may include the following operations 101 to 103.

Operation 101 includes receiving request information (or message) for establishing a path for a service. In addition to the original information (such as a source node identifier, a destination node identifier, and a bandwidth requirement), the request information further indicates a service type and a resource reservation scheme to determine a FlexE link channel for transmission of the service. The service type may include a client private line service, a general service, other services, or the like, and the resource reservation scheme may include an exclusive type or a convergence type. The request information may be initiated by a centralized controller or a distributed protocol.

In an implementation, if the resource reservation scheme is an exclusive type, it indicates that the channel of the FlexE link carries the service solely, and cannot be used for other services anymore; and if the resource reservation scheme is the convergence type, it indicates that under the condition of sufficient bandwidth, services of the same type are allowed to be transmitted on the channel of the FlexE link, but services of different types cannot be transmitted on the channel of the FlexE link in a mixed manner.

Operation 102 includes computing a path for the service according to topology information of a FlexE link through which the service is transmitted and the request information. The topology information contains a desired TE attribute.

Operation 103 includes reserving a resource and establishing a path for the service according to the service type and the resource reservation scheme, and a service type and a resource reservation scheme on a channel of the FlexE link through which the service is transmitted.

Figure 2:
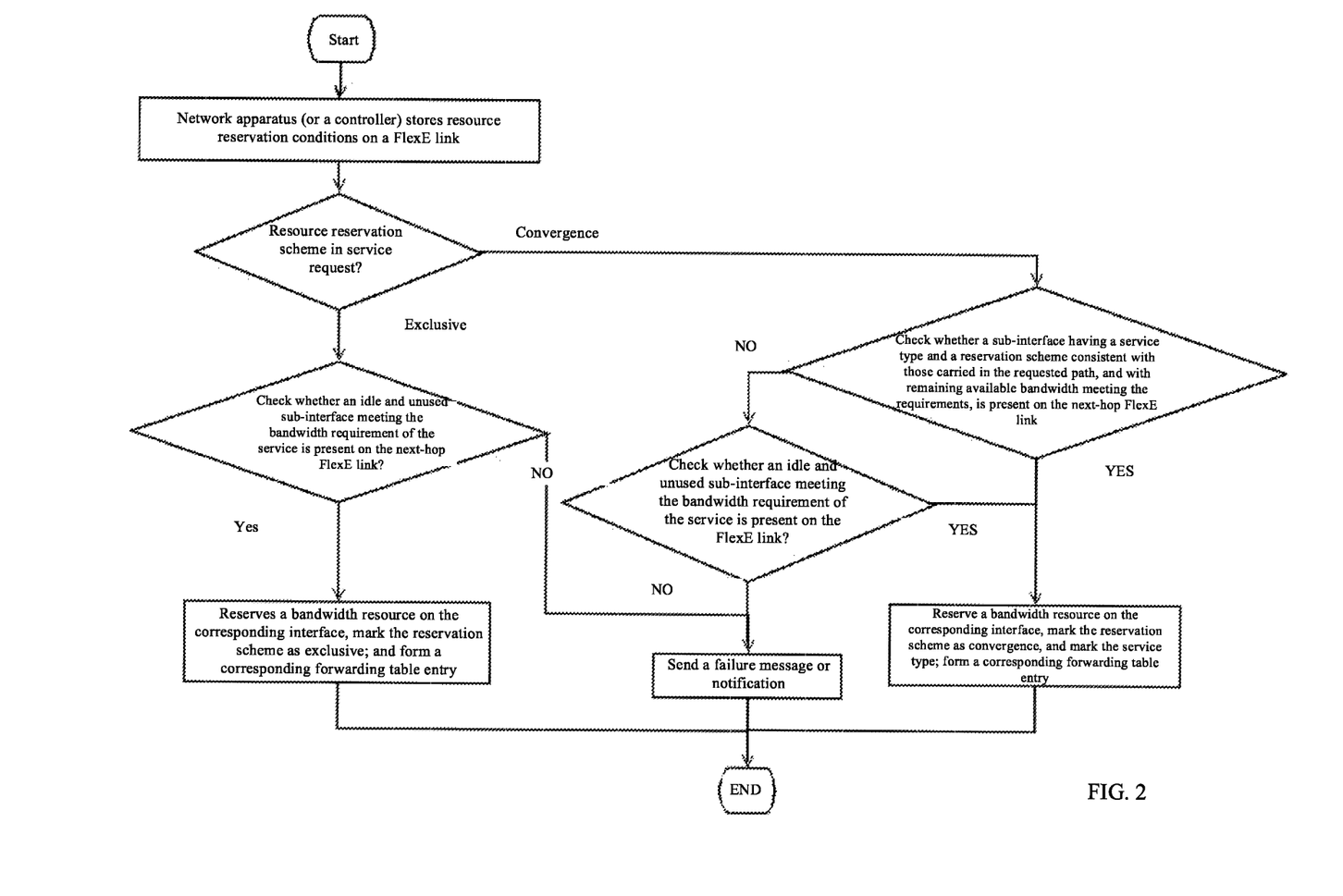
FIG. 2 is a processing flowchart of a method for establishing a service path according to an embodiment of the present disclosure.

The detailed processing in operation 103 is shown in FIG. 2, and exemplarily includes the following operations 1031 to 1035.

At operation 1031, a network apparatus (or a controller) stores resource reservation conditions, service types, and resource reservation schemes on all channels of a FlexE link through which the network apparatus passes to a next-hop network apparatus. A FlexE channel between the two network apparatuses mentioned above may be triggered by a service and established through a GMPLS protocol, or may be configured in advance. The channel of the FlexE link may be a sub-interface or a sub-channel.

At operation 1032, if the resource reservation scheme for the service path requested to be established is an exclusive type, the network apparatus, when reserving the resource and based on a designated path, checks whether an idle and unused FlexE channel meeting the bandwidth requirement of the service is present on the next-hop FlexE link, and reserves, if the FlexE channel is present, a bandwidth resource on the corresponding channel, and forms a forwarding table entry corresponding to the service.

Otherwise, the processing turns to operation 1035, where a service path establishment failure message is sent.

At operation 1033, if the resource reservation scheme for the service path requested to be established is a convergence type, the apparatus, when reserving the resource and based on a designated path, checks whether an FlexE channel marked as convergence, having a marked service type consistent with the service type carried in the requested path, and with remaining available bandwidth meeting the service bandwidth requirement, is present on the next-hop FlexE link, and reserves, if the FlexE channel is present, a bandwidth resource desired for the service on the corresponding channel, and forms a forwarding table entry corresponding to the service.

If no FlexE channel that satisfies the above conditions is present, the processing turns to operation 1034.

At operation 1034, it is checked whether an idle and unused FlexE channel meeting the bandwidth requirement of the service is present on the FlexE link, and reserves, if the FlexE channel is present, a bandwidth resource on the corresponding channel, and forms a forwarding table entry corresponding to the service.

Otherwise, the processing turns to operation 1035, where a service path establishment failure message is sent.

In an implementation, the method for establishing a service path further includes the following operation 104.

Operation 104 includes marking a service type and a resource reservation scheme on a channel of the FlexE link to which the service is mapped.

In an implementation, the method further includes, after operation 1032, marking the service type of the service on the channel, and marking the resource reservation scheme on the channel as exclusive; or includes, after operation 1033, marking the service type of the service on the channel, and marking the resource reservation scheme on the channel as convergence; or includes, after operation 1034, marking the service type of the service on the channel, and marking the resource reservation scheme on the channel as convergence.

Different service types may have different QoS (Quality of Service) requirements, and before the processing of the present disclosure, some additional processing may be desired for certain services. For example, general services have relatively low requirements on latency and jitter, and thus no processing is desired; while client private line services expect higher transmission quality with stricter requirements on latency and jitter. Therefore, determinacy of latency and jitter needs to be ensured among a plurality of services converged to the same FlexE channel.

In an implementation, in order to implement the above method, a service type flag, a resource reservation scheme flag, and reservable bandwidth parameters are added to attributes of each FlexE channel of the network apparatus, and when a resource reservation message or instruction is received, a desired bandwidth for the service is reserved on the qualified FlexE channel, and the corresponding service type and resource reservation scheme are marked.

The above method for establishing a service path in the present disclosure may be used in centralized control network architecture, or a distributed network, or distributed/centralized hybrid network architecture.

In the distributed network architecture, in order to implement the above method, a Group-Type (service type) field and a Resv-Type (resource reservation scheme) field need to be added to the request information for establishing a path for a service (e.g., a Path message and a Resv (resource reservation) message of RSVP, or other path request protocols/resource reservation protocols, etc.), so that resources are reserved and type flags and resource reservation scheme flags are added on corresponding FlexE channels of the network apparatus along the way through message transmission.

In the distributed/centralized hybrid network architecture, when a centralized management and control platform (such as a controller) and a network apparatus need to exchange path computation related messages through a Path Computation Element Protocol (PCEP), a Group-Type field and a Resv-Type field also need to be added to a corresponding message (such as a path computation request (PCReq) message, a path computation reply (PCRep) message, a path computation initiate (PCInitiate) message, or the like), and the newly added path request information is transmitted to a path computation client (PCC) or path computation element (PCE) through message interaction, so as to reserve a resource and establish a service path according to the method of the present disclosure.

A FlexE group may be regarded as a logical interface including a plurality of channels. In the existing implementations, a link-state database may collect link states of the logical interface, such as a FlexE group number, a bound PHY interface number, rates of channels, information on whether a channel is idle, or other information; and in order for a PCE to compute a service path, the PCE needs to know a network topology and resource occupation conditions. Therefore, the method of the present disclosure needs to further extend link attributes in a routing protocol (e.g., OSPF-TE, ISIS-TE, etc.), and add service type and resource reservation scheme attributes. An exclusive type indicates that the FlexE channel is occupied exclusively and cannot be used for other services anymore; and a convergence type indicates that the interface can be used for other services of the same type. Meanwhile, the existing bandwidth-related attributes, such as the maximum reservable bandwidth and the unreserved bandwidth, may also be carried for further explaining conditions of the reserved resource for the service type on the FlexE channel.

Figure 3:
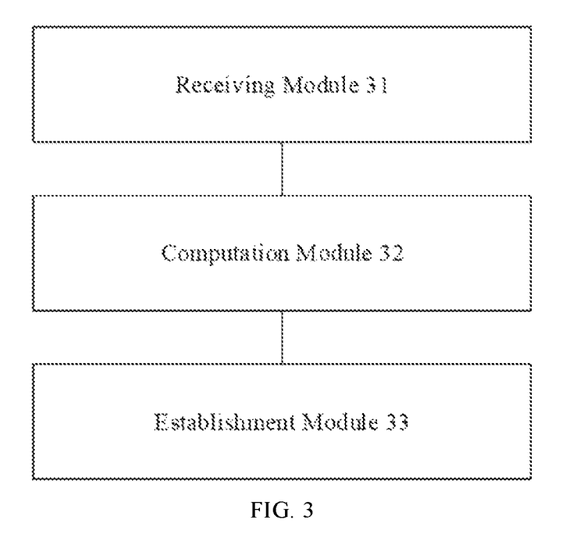
FIG. 3 is a block diagram of a device for establishing a service path according to an embodiment of the present disclosure.

In another embodiment, as shown in FIG. 3, FIG. 3 is a block diagram of a device for establishing a service path according to an embodiment of the present disclosure, including a receiving module 31 configured to receive request information for establishing a path for a service, where the request information includes a service type and a resource reservation scheme; a computation module 32 configured to compute a path for the service according to topology information of a Flexible Ethernet (FlexE) link through which the service is transmitted and the request information; and an establishment module 33 configured to reserve a resource and establish a path for the service according to the service type and the resource reservation scheme, and a service type and a resource reservation scheme on a channel of the FlexE link through which the service is transmitted.

The establishment module 33 includes: a storage unit 3031, in which a network apparatus (or a controller) stores resource reservation conditions, service type flags, and resource reservation scheme flags on all FlexE channels of a FlexE link through which the network apparatus passes to a next-hop network apparatus; where a FlexE channel between the two network apparatuses mentioned above may be triggered by a service and established through a GMPLS protocol, or may be configured in advance; a first forward unit 3031 by which if the resource reservation scheme for the service path requested to be established is an exclusive type, the network apparatus, when reserving the resource and based on a designated path, checks whether an idle and unused FlexE channel meeting the bandwidth requirement of the service is present on the next-hop FlexE link, and reserves, if the FlexE channel is present, a bandwidth resource on the corresponding channel, and forms a forwarding table entry corresponding to the service; a second forward unit 3032 by which if the resource reservation scheme for the service path requested to be established is a convergence type, the apparatus, when reserving the resource and based on a designated path, checks whether an FlexE channel marked as convergence, having a marked service type consistent with the service type carried in the requested path, and with remaining available bandwidth meeting the service bandwidth requirement, is present on the next-hop FlexE link, and reserves, if the FlexE channel is present, a bandwidth resource desired for the service on the corresponding channel, and forms a forwarding table entry corresponding to the service; and a third forward unit 3033 configured to check, if no FlexE channel that satisfies the above conditions is present, whether an idle and unused FlexE channel meeting the bandwidth requirement of the service is present on the FlexE link, and reserve, if the FlexE channel is present, a bandwidth resource on the corresponding channel, and form a forwarding table entry corresponding to the service; and a service establishment failure unit 3034 configured to send a service path establishment failure message.

The present application will be further illustrated below by way of application examples.

Figure 4:
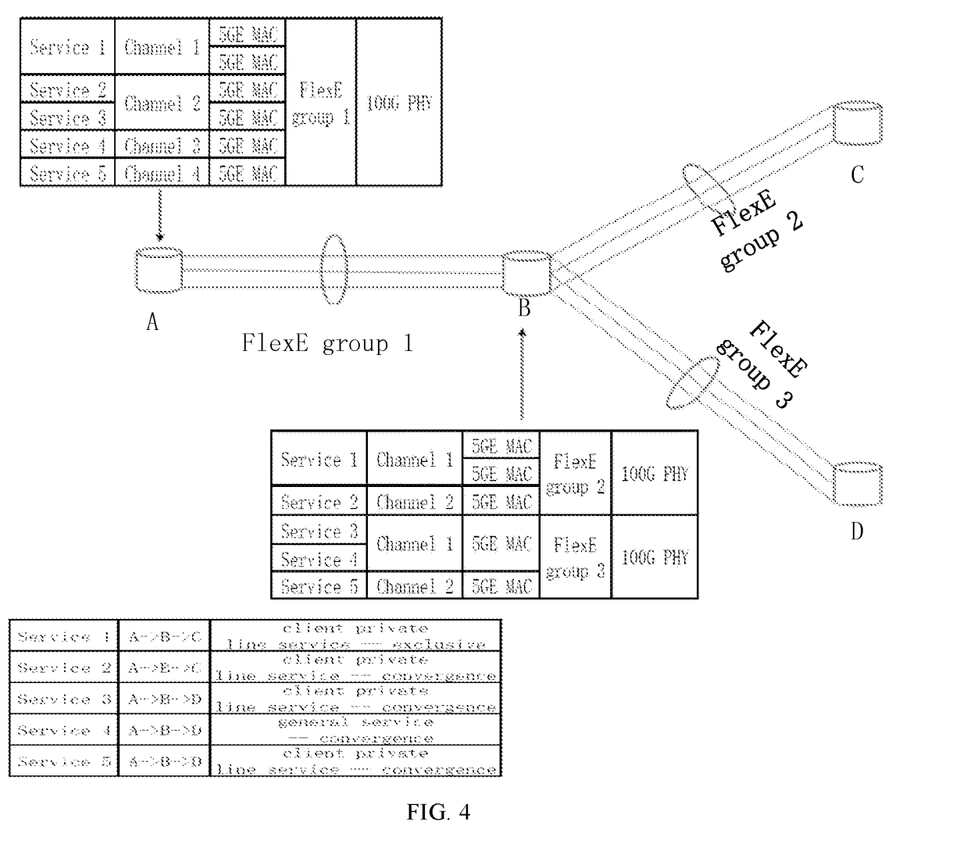
FIG. 4 is a result presentation of service path establishment according to an embodiment of the present disclosure.

This example describes a process of establishing a service path by a controller in a centralized control mode. As shown in FIG. 4, FlexE links are provided between network apparatuses A, B, C and D, respectively. Assuming that in an initial state, each FlexE link has a bandwidth of 100G, composed of 20 channels with a rate of 5G all in an idle and unused state, and considering that some additional overhead may be added during transmission of packets, assuming that 80% of the rate of each channel is available for service, that is, the maximum reservable bandwidth of each channel is 4G. This example of establishing a service path includes the following operations 1 to 5.

Operation 1. Service 1 requests a path which is A-->B-->C, the service type is client private line service, the resource reservation scheme is an exclusive type, and the service bandwidth is 8G. According to the method shown in the flowchart of FIG. 4, service 1 on apparatus A is mapped to FlexE channel 1 (including two 5G rate channels) of FlexE group 1, and then, the resource occupation scheme of FlexE channel 1 is marked as exclusive, and the service type is marked as client private line. Service 1 on apparatus B is mapped to FlexE channel 1 (including two 5G rate channels) of FlexE group 2, and then, the resource occupation scheme of FlexE channel 1 is marked as exclusive, and the service type is marked as client private line.

Operation 2. Service 2 requests a path which is A-->B-->C, the service type is client private line service, the resource reservation scheme is a convergence type, and the service bandwidth is 1G. According to the method shown in the flowchart of FIG. 4, service 2 on apparatus A is mapped to FlexE channel 2 (including one 5G rate channel) of FlexE group 1, and then, the resource occupation scheme of FlexE channel 2 is marked as convergence, the service type is marked as client private line, and the reservable bandwidth is updated to 3G. Service 2 on apparatus B is mapped to FlexE channel 2 (including one 5G rate channel) of FlexE group 2, and then, the resource occupation scheme of FlexE channel 2 is marked as convergence, the service type is marked as client private line, and the reservable bandwidth is updated to 3G.

Operation 3. Service 3 requests a path which is A-->B-->D, the service type is client private line service, the resource reservation scheme is a convergence type, and the service bandwidth is 2G. According to the method shown in the flowchart of FIG. 4, service 3 on apparatus A is mapped to FlexE channel 2 of FlexE group 1, and then, the resource occupation scheme of FlexE channel 2 is marked as convergence, the service type is marked as client private line, and the reservable bandwidth is updated to 1G. Service 3 on apparatus B is mapped to FlexE channel 1 (including one 5G rate channel) of FlexE group 3, and then, the resource occupation scheme of FlexE channel 1 is marked as convergence, the service type is marked as client private line, and the reservable bandwidth is updated to 2G.

Operation 4. Service 4 requests a path which is A-->B-->D, the service type is general, the resource reservation scheme is a convergence type, and the service bandwidth is 0.5G. According to the method shown in the flowchart of FIG. 4, service 4 on apparatus A is mapped to FlexE channel 3 of FlexE group 1, and then, the resource occupation scheme of FlexE channel 3 is marked as convergence, the service type is marked as general, and the reservable bandwidth is updated to 3.5G. Service 4 on apparatus B is mapped to FlexE channel 2 (including one 5G rate channel) of FlexE group 3, and then, the resource occupation scheme of FlexE channel 2 is marked as convergence, the service type is marked as general, and the reservable bandwidth is updated to 3.5G.

Operation 5. Service 5 requests a path which is A-->B-->D, the service type is client private line service, the resource reservation scheme is a convergence type, and the service bandwidth is 2G. According to the method shown in the flowchart of FIG. 4, service 5 on apparatus A is mapped to FlexE channel 4 (including one 5G rate channel) of FlexE group 1, and then, the resource occupation scheme of FlexE channel 4 is marked as convergence, the service type is marked as client private line, and the reservable bandwidth is updated to 2G. Service 5 on apparatus B is mapped to FlexE channel 1 of FlexE group 3, and then, the resource occupation scheme of FlexE channel 1 is marked as convergence, the service type is marked as client private line, and the reservable bandwidth is updated to 0G.

Finally, the resulted service path is as shown in FIG. 4.

Figure 5:
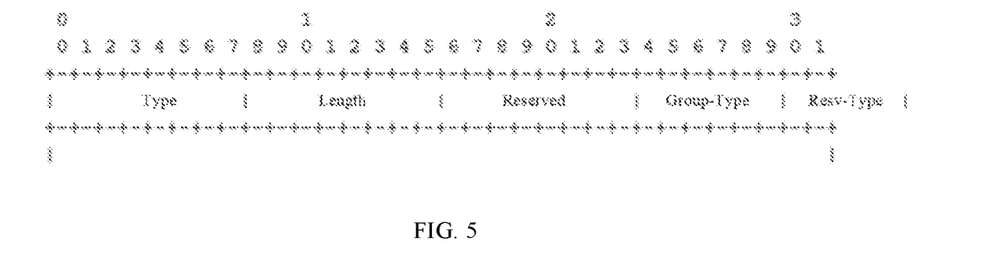
FIG. 5 is a schematic diagram of an extended RSVP-TE protocol format according to an embodiment of the present disclosure.

Another example of the present disclosure describes a method for establishing a service path under an extended Resource Reservation Protocol-Traffic Engineering (RSVP-TE) Protocol, which is specifically implemented as follows. An LSP_ATTRIBUTES object in RSVP-TE is configured to interact with attributes supported by LSP, and in the present disclosure, a sub-TLV including a service type and a resource reservation scheme is extended in the object, of which a schematic structural diagram is shown in FIG. 5, and the fields therein are listed below:

Type: 8 bits, representing a type of the newly added sub-TLV, where the specific type number may be set as needed;
Length: 8 bits, representing a data length of the newly added sub-TLV;
Reserved: 8 bits, representing a reserved field;
Group-Type: 6 bits, configured to distinguish different service types and taking a value in a range of 0 to 63, in which, for example, 0 represents general service, 1 represents client private line service, and the specific type numbers and definitions thereof may be set as needed; and
Resv-Type: 2 bits, representing a resource reservation scheme and taking a value in a range of 0 to 3, in which, for example, 0 represents an exclusive type, 1 represents a convergence type, and the specific type numbers may be set as needed.

After the RSVP-TE message is extended, a signaling interaction process includes the following first and second operations.

In the first operation, a path source node encapsulates a Path message carrying the extended LSP_ATTRIBUTES object, including a Group-Type field and a Resv-Type field, and the Path message is transmitted along an Explicit Route Object (ERO) indication path to a destination node; and the Path message sent from each node enroute to a downstream node needs to carry the extended LSP_ATTRIBUTES object, including the Group-Type field and the Resv-Type field.

In the second operation, after receiving the Path message, the destination node returns a Resv message along a reverse Path of the ERO, where the Resv message also needs to carry the extended LSP_ATTRIBUTES object, including a Group-Type field and a Resv-Type field, and after receiving the Resv message, each node enroute reserves a resource at a proper interface and forms a forwarding table according to the newly added attributes carried in the message and the newly added type flags and reservation scheme flags on local interfaces, in combination with other original contents of the message, and then continues to send the Resv message to an upstream node until the source node.

This embodiment is illustrated taking the RSVP-TE protocol as an example, but it is also applicable to other path request/resource reservation protocols, which are not listed herein.

Another example of the present disclosure describes a method for establishing a service path under an extended Open Shortest Path First-Traffic Engineering (OSPF-TE) protocol, which is specifically implemented as follows.

Figure 6:
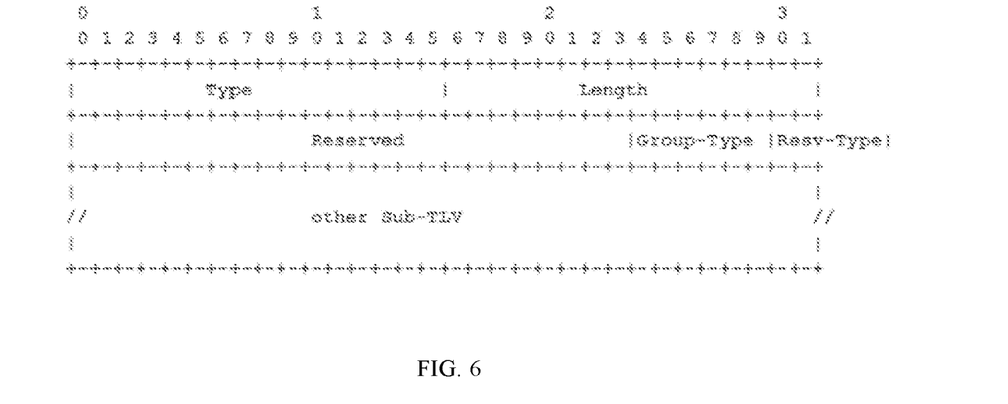
FIG. 6 is a schematic diagram of an extended OSPF-TE protocol format according to an embodiment of the present disclosure

A sub-TLV including a service type and a resource reservation scheme is newly added to a Link TLV of the OSPF-TE, of which a schematic structural diagram is shown in FIG. 6, and the fields therein are listed below:

Type: 16 bits, representing a type of the newly added sub-TLV, where the specific type number may be set as needed;
Length: 16 bits, representing a data length of the newly added sub-TLV;
Reserved: 24 bits, representing a reserved field;
Group-Type: 6 bits, configured to distinguish different service types and taking a value in a range of 0 to 63, in which, for example, 0 represents general service, 1 represents client private line service, and the specific type numbers and definitions thereof may be set as needed; and
Resv-Type: 2 bits, representing a resource reservation scheme and taking a value in a range of 0 to 3, in which, for example, 0 represents an exclusive type, 1 represents a convergence type, and the specific type numbers may be set as needed.

This sub-TLV can be used together with sub-TLVs of other Link TLVs. For example, when Resv-Type is convergence, it is recommended to carry bandwidth-related sub-TLVs, such as maximum reservable bandwidth, unreserved bandwidth, or the like.

The network is connected through FlexE Links, OSPF floods in a domain thereof, and notifies TE attributes including the newly added service type and resource reservation scheme of the Link TLV. After that, a link-state database of a network apparatus in the OSPF domain acquires a network topology and TE attributes in the domain, including a service type and a resource reservation scheme on each channel of the FlexE link, and, if desired, bandwidth-related attributes of each channel. With such information, the PCE may compute paths on demand.

This embodiment is illustrated taking the OSPF-TE protocol extension as an example, but it is also applicable to other routing protocols, which are not listed herein.

Another example of the present disclosure describes a method for establishing a service path under an extended PCEP protocol, which is specifically implemented as follows.

Figure 7A:
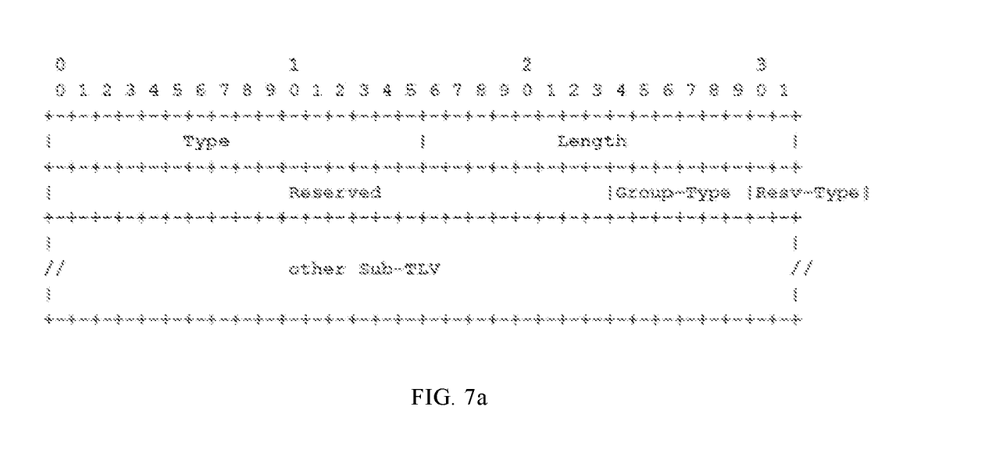
FIG. 7a is a schematic diagram of a TLV format newly added to an RP/SRP object in an extended PCEP protocol according to an embodiment of the present disclosure.

A TLV including a service type and a resource reservation scheme is newly added to a Request Parameters (RP) object and a Stateful PCE Request Parameters (SRP) object of PCEP, respectively, of which a schematic structural diagram is shown in FIG. 7a, and the fields therein are listed below.

Type: 16 bits, representing a type of the newly added sub-TLV, where the specific type number may be set as needed;

Length: 16 bits, representing a data length of the newly added sub-TLV;

Reserved: 24 bits, representing a reserved field;

Group-Type: 6 bits, configured to distinguish different service types and taking a value in a range of 0 to 63, in which, for example, 0 represents general service, 1 represents client private line service, and the specific type numbers and definitions thereof may be set as needed; and Resv-Type: 2 bits, representing a resource reservation scheme and taking a value in a range of 0 to 3, in which, for example, 0 represents an exclusive type, 1 represents a convergence type, and the specific type numbers may be set as needed.

Figure 7B:
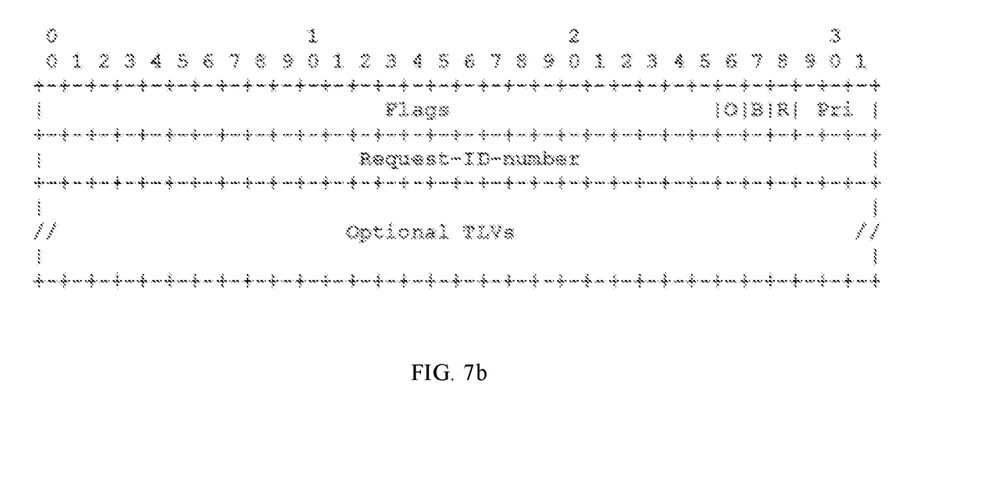
FIG. 7b is a diagram of an RP object format in the extended PCEP protocol according to an embodiment of the present disclosure.
Figure 7C:
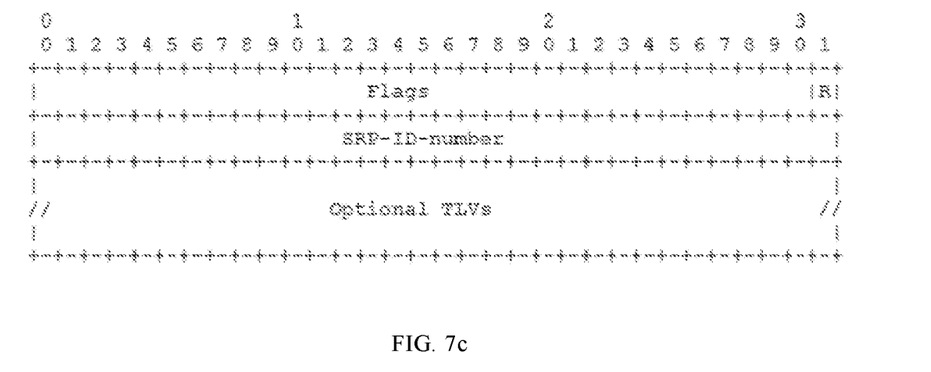
FIG. 7c is a diagram of an SRP object format in the extended PCEP protocol according to an embodiment of the present disclosure.

The newly added TLVs may be placed at positions of Optional TLVs of the RP object and the SRP object. A format of the RP object is shown in FIG. 7b, and a format of the SRP object is shown in FIG. 7c. In the figures, O is a strict or loose routing flag, B is a bidirectional path flag, R is a re-optimization flag, and Pri is a priority indicator.

When the PCC sends a PCReq message to the PCE to request path computation, the extended RP object and other desired objects are carried in the PCReq message, and after receiving the PCReq message, the PCE carries out the path computation according to the carried information (including the service type and the resource reservation scheme). Then, the PCE returns a PCRep message to the PCC, which also needs to carry the extended RP object and other desired objects in the PCRep message to return a path computation result to the PCC, and after receiving the PCRep message, the PCC establishes and reserves a path according to the carried information (including the service type and the resource reservation scheme) (e.g., via RSVP-TE).

Likewise, in a stateful PCE model, the PCC sends a path computation report (PCRpt) message to the PCE, and the PCE sends a path computation update (PCUpd) message, a PCInitiate message, or the like to the PCC. When an SRP object is desired, the extended SRP object (including a service type and a resource reservation scheme) is used so that the PCE to compute the path, and the PCC to establish the path, can obtain the corresponding service type and resource reservation scheme from the carried contents in the message conveniently. The interaction processes of various messages are the same as those in the original protocols and thus are not repeated.

Those of ordinary skill in the art will appreciate that all or some operations of the above described method, functional modules/units in the system and device may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all components may be implemented as software executed by a processor, such as a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

INDUSTRIAL APPLICABILITY

Compared with the existing art, the method for establishing a service path provided in the present application, by reserving a resource and establishing a path for the service according to the service type and the resource reservation scheme for the service, and a service type flag and a resource reservation scheme flag on a channel of the FlexE link through which the service is transmitted, solves the technical problem that flexible establishment of a service path according to a service type and a resource reservation scheme is not supported in a client private line scenario, enables a more flexible path establishment method that can meet the requirements of the client private line scheme scenario.

What is claimed is:

1. A method for establishing a service path, comprising:
receiving request information for establishing a path for a service, the request information comprising a service type and a resource reservation scheme;
computing a path for the service according to topology information of a Flexible Ethernet (FlexE) link through which the service is transmitted and the request information; and
reserving a resource and establishing a path for the service according to the service type and the resource reservation scheme, and a service type and a resource reservation scheme on a channel of the FlexE link through which the service is transmitted, wherein before the reserving the resource and establishing the path for the service according to the service type and the resource reservation scheme, and the service type and the resource reservation scheme on the channel of the FlexE link through which the service is transmitted, the method further comprises:

marking a service type and a resource reservation scheme on the channel of the FlexE link through which the service is transmitted, wherein when the resource reservation scheme is an exclusive type, the channel of the FlexE link carries the service solely; and when the resource reservation scheme is a convergence type, the channel of the FlexE link carries the service and other services of the same type as the service, wherein the reserving the resource and establishing the path for the service according to the service type and the resource reservation scheme, and the service type and the resource reservation scheme on the channel of the FlexE link through which the service is transmitted comprises:

in a case where the resource reservation scheme is the exclusive type, when an idle and unused channel that meets a bandwidth requirement of the service is present on a next-hop FlexE link of a network apparatus, reserving a bandwidth resource desired for the service on the channel, and generating a forwarding table entry corresponding to the service; otherwise, sending a service path establishment failure message, or, in a case where the resource reservation scheme is the convergence type, when the resource reservation scheme on the channel of a next-hop FlexE link of a network apparatus is marked as convergence, and meanwhile, the marked service type is consistent with the service type carried in the request information and residual available bandwidth on the channel meets a bandwidth requirement of the service, reserving a bandwidth resource desired for the service on the channel, and generating a forwarding table entry corresponding to the service; otherwise, judging whether an idle and unused channel meeting the bandwidth requirement of the service is present on the next-hop FlexE link of the network apparatus; reserving, when an idle and unused channel that meets the bandwidth requirement of the service is present on the next-hop FlexE link of the network apparatus, a bandwidth resource desired for the service on the channel, and generating a forwarding table entry corresponding to the service; and sending, when there is no qualified channel, a service path establishment failure message.

2. The method according to claim 1 wherein in the case where the resource reservation scheme is the exclusive type, the method further comprises: marking the service type of the service on the channel, and marking the resource reservation scheme on the channel as the exclusive type.

3. A device for establishing a service path, comprising a processor which, when executing a computer program, is configured to:

receive request information for establishing a path for a service, the request information comprising a service type and a resource reservation scheme;

compute a path for the service according to topology information of a Flexible Ethernet (FlexE) link through which the service is transmitted and the request information; and reserve a resource and establish a path for the service according to the service type and the resource reservation scheme, and a service type and a resource reservation scheme on a channel of the FlexE link through which the service is transmitted, wherein the processor, when executing the computer program, is further configured to: before the reserving the resource and establishing the path for the service according to the service type and the resource reservation scheme, and the service type and the resource reservation scheme on the channel of the FlexE link through which the service is transmitted, mark a service type and a resource reservation scheme on the channel of the FlexE link through which the service is transmitted, wherein when the resource reservation scheme is an exclusive type, the channel of the FlexE link carries the service solely; and when the resource reservation scheme is a convergence type, the channel of the FlexE link carries the service and other services of the same type as the service, wherein the reserving the resource and establishing the path for the service according to the service type and the resource reservation scheme, and the service type and the resource reservation scheme on the channel of the FlexE link through which the service is transmitted comprises:

in a case where the resource reservation scheme is the exclusive type, when an idle and unused channel that meets a bandwidth requirement of the service is present on a next-hop FlexE link of a network apparatus, reserving a bandwidth resource desired for the service on the channel, and generating a forwarding table entry corresponding to the service; otherwise, sending a service path establishment failure message, or, in a case where the resource reservation scheme is the convergence type, when the resource reservation scheme on the channel of a next-hop FlexE link of a network apparatus is marked as convergence, and meanwhile, the marked service type is consistent with the service type carried in the request information and residual available bandwidth on the channel meets a bandwidth requirement of the service, reserving a bandwidth resource desired for the service on the channel, and generating a forwarding table entry corresponding to the service; otherwise, judging whether an idle and unused channel meeting the bandwidth requirement of the service is present on the next-hop FlexE link of the network apparatus; reserving, when an idle and unused channel that meets the bandwidth requirement of the service is present on the next-hop FlexE link of the network apparatus, a bandwidth resource desired for the service on the channel, and generating a forwarding table entry corresponding to the service; and sending, when there is no qualified channel, a service path establishment failure message.

4. A non-transitory computer-readable storage medium having a computer program stored thereon, wherein the computer program is configured to cause the method according to claim 1 to be implemented.

5. An electronic apparatus, comprising: a processor and a memory, wherein the processor is configured to execute a computer program to implement the method according to claim 1.

6. A non-transitory computer-readable storage medium having a computer program stored thereon, wherein the computer program is configured to cause the method according to claim 2 to be implemented.

7. An electronic apparatus, comprising: a processor and a memory, wherein the processor is configured to execute a computer program to implement the method according to claim 2.

* * * * *